Patented July 10, 1934

1,966,389

UNITED STATES PATENT OFFICE 1,966,389

TABBING COMPOUND

Leon J. D. Healy, Milwaukee, Wis., assignor to The Lee Hardware Company, Salina, Kans.

No Drawing. Application January 4, 1933, Serial No. 650,204

5 Claims. (Cl. 87—17)

The present invention relates to a tabbing composition, namely a composition of matter in a viscous liquid condition, which, when applied to the edges of a stack of paper sheets, will give a holding surface, for making a tablet or pad of paper from said sheets. The bottom and/or top sheet may of course be thick paper or cardboard if desired, although this is not necessary.

Various compositions have heretofore been proposed for the purpose indicated, the most successful, to my knowledge being those indicated in the patents of Brick 1,341,782 and Harris 1,521,947. In both of the said compositions, rubber is employed as a constituent of the tabbing composition. While the compositions as set forth in these two patents are generally quite satisfactory for the purpose, but in excessively hot and humid climates, or in climates where very high temperature and extreme humidity prevail during a rather long season, the said compositions are likely to not retain their flexibility and tackiness and water-resistance. The said compositions also may, during long continued hot damp spells, become excessively tacky on the surface, making the same, or tablets made up with the same, objectionable to handle.

The present invention aims at improving the consistency and permanence of tabbing compositions, and also involves the utilization of rubber latex direct, instead of ready-formed rubber. The invention thereby does away with the use of expensive volatile solvents such as have heretofore been generally used in compositions of this sort. A further object is the simplification of the process of making the tabbing composition, and the simplification of the apparatus used in such manufacture.

In the preferred method of carrying out the invention of the present case, I employ, as the starting material, liquid rubber latex (which ordinarily contains a small amount of ammonia as a preservative) and I subject this to well known methods of vulcanizing the rubber therein without coagulation of the latex. Methods for accomplishing this are already well known in the art, and include the addition of a vulcanizing agent such as sulphur and an accelerator of vulcanization, the said vulcanization operation being carried out at about ordinary atmospheric pressure, and without the need of heating the latex to temperatures such as are commonly used in the vulcanization of rubber.

The vulcanized uncoagulated latex would however not serve as such, as a tabbing composition, because it lacks sufficient tackiness to adhere with sufficient strength to the paper or backing, and it is also too stringy and peels badly. These defects can be overcome, in accordance with the present invention, by incorporating therewith certain stabilizers such as casein, colloidal gum solution, tack producing materials such as glues, starches, hemoglobin, egg albumen, and the like. The strength and the tearing resistance is built up by the addition of one of several varieties of fibrous material such as asbestos, wood fibre, cellulose flocks, cotton or wool flocks or the like.

As a specific example of the invention, the following is given, it being understood that this is given purely for the purpose of illustration.

775 parts of uncoagulated vulcanized latex, containing say 40 to 42% by weight of total solids constitutes the first ingredient.

The second ingredient is prepared by dissolving 50 parts of casein in about 150 parts of distilled water (preferably with the addition of an alkali which may be caustic soda, alkaline sodium salts or ammonia).

Third, 50 parts of egg albumen are dissolved in about 200 parts of water to produce a highly viscous solution. Various gums, glues, starches and the like can be substituted for the egg albumen.

A fourth component is made by adding 125 parts of a 2% ammonia solution, to 5 parts of dried wood fibre and 5 parts of cellulose flocks (or other fibrous material) and the said mixture is stirred until a substantially uniform suspension is produced. A small amount of a deodorant composition such as oil of wintergreen can also be added at this point if desired.

The casein solution and the egg albumen solution are then added slowly with constant stirring to the vulcanized uncoagulated latex, and the stirring is continued until a uniform or homogeneous mass is produced. If desired, suitable coloring materials can be added at this stage and can be thoroughly stirred in.

The ammoniacal liquor containing the fibrous material "fourth component" is then added and the entire mixture thoroughly stirred or churned in order to produce a uniform mixture. This mixture is then ready to be used for tabbing, or it can be simply canned and used at any subsequent time.

For tabbing, the paper is jogged if desired to give a substantially smooth surface of edges, to which one coat of the material is brushed on rapidly. Then after five or ten minutes a second coat is preferably applied. This second coat can be daubed on heavily, and quickly brushed down to a smooth coating. The composition will dry firm and the exposed surface will be substantially free from tackiness in about half an hour or sometimes twenty or twenty-five minutes, depending upon atmospheric conditions. The complete strength of the composition is however not developed for several hours after application. If desired, the tablets can be allowed to stand quiet for several hours, until substantially the maximum strength has developed. The surface can be finally dusted over with a suitable pulverulent material, such as talc powder if desired, although ordinarily this will not be found necessary, since the composition after drying does not stick to other surfaces with which it comes into contact, at least to an objectionable degree.

The brushes or the like used in applying the composition can be readily cleaned by being washed in water, and any of the material which gets onto the hands of the user can be readily washed off with water.

In case the solution becomes too thick, it can be diluted with soft water (preferably rain water or distilled water). Hard water would be injurious to the compound.

In the above example, the quantity of water to be used with the casein can be varied, as well as the amount of water to be used with the egg albumen. Ordinarily I would recommend using 3 parts of water with each part of casein and 4 parts of water with each part of egg albumen.

The egg albumen solution and the casein solution can be mixed together before adding to the vulcanized uncoagulated latex if desired, but I prefer to add the two solutions to the vulcanized latex as stated in the example.

As a substitute for the egg albumen solution, I may employ 250 parts of a 25% solution of acacia gum dissolved in water, or 250 parts of a 25% solution of starch (or paste) such as tapioca starch, or I may use the same amount of a 25% solution of hemoglobin in water. These solutions are given merely as illustrations of suitable adhesive materials.

Instead of the casein solution above referred to, I may use 25 parts of glue dissolved in 75 parts of water. When animal glue is used, care must be exercised that sufficient ammonia or other protective colloid be present to preserve the stability of the solution. An excessive amount of glue, or the addition of the glue too rapidly is likely to coagulate the rubber latex.

I claim:—

1. In the process of making a tabbing composition, the improvement which comprises adding a viscous aqueous liquid containing casein and a viscous aqueous solution of an albumen, to uncoagulated vulcanized rubber latex, then adding fibrous material, and rendering the mixture substantially homogeneous.

2. In the process of making a tabbing composition, the herein described improvement which comprises thoroughly mixing uncoagulated vulcanized rubber latex, a solution of an adhesive substance including a nitrogenous material, and a fibrous material, in a somewhat alkaline condition.

3. A process of making a tabbing composition which comprises adding a viscous aqueous liquid containing casein, and a viscous aqueous solution of albumen to uncoagulated vulcanized rubber latex, rendering the mixture substantially uniform, incorporating therewith an aqueous liquid containing fibrous material, and stirring until substantially uniform, the proportions being such as to maintain in the final liquid a slight alkalinity due to ammonia.

4. A tabbing composition comprising an uncoagulated vulcanized rubber latex, dissolved casein, dissolved albumen, and solid fibrous material, and containing a small amount of free ammonia in solution.

5. A tabbing composition comprising an uncoagulated vulcanized latex, dissolved adhesive material which includes a nitrogenous glue base, and a fibrous material, all uniformly mixed, said composition being slightly alkaline with ammonia and being stable.

LEON J. D. HEALY.